US012477316B2

(12) United States Patent
Casati

(10) Patent No.: US 12,477,316 B2
(45) Date of Patent: Nov. 18, 2025

(54) NETWORK SLICE LOCAL SWITCHING AT A DISTRIBUTED UNIT

(71) Applicant: NOKIA TECHNOLOGIES OY, Espoo (FI)

(72) Inventor: Alessio Casati, West Molesey (GB)

(73) Assignee: Nokia Technologies Oy, Espoo (FI)

(*) Notice: Subject to any disclaimer, the term of this patent is extended or adjusted under 35 U.S.C. 154(b) by 439 days.

(21) Appl. No.: 18/247,251

(22) PCT Filed: Sep. 30, 2020

(86) PCT No.: PCT/FI2020/050644
§ 371 (c)(1),
(2) Date: Mar. 29, 2023

(87) PCT Pub. No.: WO2022/069788
PCT Pub. Date: Apr. 7, 2022

(65) Prior Publication Data
US 2023/0379687 A1 Nov. 23, 2023

(51) Int. Cl.
H04W 8/08 (2009.01)
H04W 48/18 (2009.01)
H04W 68/02 (2009.01)

(52) U.S. Cl.
CPC ............. *H04W 8/08* (2013.01); *H04W 48/18* (2013.01); *H04W 68/02* (2013.01)

(58) Field of Classification Search
CPC ........ H04W 8/08; H04W 48/18; H04W 68/02
(Continued)

(56) References Cited

U.S. PATENT DOCUMENTS

2019/0335366 A1  10/2019  Jin et al.
2020/0296631 A1   9/2020  Young et al.

FOREIGN PATENT DOCUMENTS

CA  3091172 A1  8/2019
CN  109151871 A  1/2019
(Continued)

OTHER PUBLICATIONS

"3rd Generation Partnership Project, Technical Specification Group Services and System Aspects; Procedures for the 5G System (5GS); Stage 2 (Release 16)", 3GPP TS 23.502, V16.4.0, Mar. 2020, pp. 1-582.
(Continued)

Primary Examiner — Joel Ajayi
(74) Attorney, Agent, or Firm — Barta Jones, PLLC

(57) ABSTRACT

There is provided an apparatus, said apparatus comprising means for receiving, from a distributed unit of a radio access network node at a centralized unit control plane part of the radio access network node, an indication that the distributed unit supports network slices providing local switching at the distributed unit, indicating, from the centralized unit control plane part of the radio access network node to a core network, that the distributed unit of the radio network node supports network slices providing local switching at the distributed unit, receiving a user equipment context from the core network, for a user equipment providing a request for local switching at the distributed unit, the request including an indication the user equipment is allowed to use at least one of the network slices providing local switching at the distributed unit, configuring for each of the network slices providing local switching at the distributed unit, at least one data transmission context at the distributed unit such that the user plane of the user equipment is terminated at the distributed unit and a protocol data unit session associated with the data transmission context becomes available to the
(Continued)

user equipment for local switching at the distributed unit and configuring for each of the network slices providing local switching at the distributed unit at least one data transmission context at the user equipment such that the user equipment can use the protocol data unit session for local switching at the distributed unit.

12 Claims, 14 Drawing Sheets

(58) Field of Classification Search
USPC .................................................. 455/414.1
See application file for complete search history.

(56) References Cited

FOREIGN PATENT DOCUMENTS

| | | |
|---|---|---|
| CN | 110167196 A | 8/2019 |
| CN | 110708720 A | 1/2020 |
| WO | 2020/031735 A1 | 2/2020 |
| WO | 2020/041368 A1 | 2/2020 |
| WO | 2020/148062 A1 | 7/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
"3rd Generation Partnership Project; Technical Specification Group Radio Access Network; NG-RAN; NG Application Protocol (NGAP) (Release 16)", 3GPP TS 38.413, V16.1.0, Mar. 2020, pp. 1-341.
"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401, V16.6.0, Mar. 2020, pp. 1-436.
International Search Report and Written Opinion received for corresponding Patent Cooperation Treaty Application No. PCT/FI2020/050644, dated Feb. 1, 2021, 16 pages.
"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.
"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.
"3rd Generation Partnership Project; Technical Specification Group Services and System Aspects, Study on enhancement of 5G System (5GS) for vertical and Local Area Network (LAN) services (Release 16)", 3GPP TR 23.734, V16.2.0, Jun. 2019, pp. 1-117.
"3rd Generation Partnership Project; Technical Specification Group Services and System Aspects; Study on enhanced support of Industrial Internet of Things (IIoT) in the 5G System (5GS) (Release 17)", 3GPP TR 23.700-20, V1.0.0, Sep. 2020, pp. 1-81.
Extended European Search Report received for corresponding European Patent Application No. 20956137.2, dated May 10, 2024, 10 pages.
"3rd Generation Partnership Project; Technical Specification Group Radio Access Network; NG-RAN; F1 application protocol (F1AP) (Release 16)", 3GPP TS 38.473, V16.2.0, Jul. 2020, pp. 1-363.
Office action received for corresponding Chinese Patent Application No. 202080107572.3, dated Nov. 11, 2024, 7 pages of office action and no page of translation available.
Yanwei et al., "5G Network Slicing Solution and Key Technologies", Postal and Telecommunications Design Technology, 2020, pp. 70-74.

Figure 5

T1: Providing, from a distributed unit of a radio access network node to a centralized unit control plane part of the radio access network node, an indication that the distributed unit supports network slices providing local switching at the distributed unit T2: Configuring for each of the network slices providing local switching at the distributed unit, at least one data transmission context at the distributed unit such that a user plane of a user equipment providing a request for local switching at the distributed unit is terminated at the distributed unit and a protocol data unit session associated with the data transmission context becomes available to the user equipment for local switching at the distributed unit

NETWORK SLICE LOCAL SWITCHING AT A DISTRIBUTED UNIT

CROSS-REFERENCE TO RELATED APPLICATIONS

This application is a national phase entry of International Application No. PCT/FI2020/050644, filed Sep. 30, 2020, the contents of which are hereby incorporated by reference in their entirety.

FIELD

The present application relates to a method, apparatus, system and computer program and in particular but not exclusively to providing local switching at a remote and/or distributed units of a distributed radio access network (RAN) node.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite-based communication systems and different wireless local networks, for example wireless local area networks (WLAN). The wireless systems can typically be divided into cells and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for receiving, from a distributed unit of a radio access network node at a centralized unit control plane part of the radio access network node, an indication that the distributed unit supports network slices providing local switching at the distributed unit, indicating, from the centralized unit control plane part of the radio access network node to a core network, that the distributed unit of the radio network node supports network slices providing local switching at the distributed unit, receiving a user equipment context from the core network, for a user equipment providing a request for local switching at the distributed unit, the request including an indication the user equipment is allowed to use at least one of the network slices providing local switching at the distributed unit, configuring for each of the network slices providing local switching at the distributed unit, at least one data transmission context at the distributed unit such that the user plane of the user equipment is terminated at the distributed unit and a protocol data unit session associated with the data transmission context becomes available to the user equipment for local switching at the distributed unit and configuring for each of the network slices providing local switching at the distributed unit at least one data transmission context at the user equipment such that the user equipment can use the protocol data unit session for local switching at the distributed unit.

The apparatus may comprise means for providing an indication from the centralized unit of the radio access network node to the core network of at least one of the network slices that allow for local switching at the distributed unit and tracking area where local switching at the distributed unit is supported The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The apparatus may comprise means for providing at least one of a time to live value and a local paging identity to the user equipment and the distributed unit from the centralized unit of the radio access network node when the centralized unit of the radio access network node releases a radio resource control connection of the user equipment.

The distributed unit may comprise an integrated access backhaul node.

In a second aspect there is provided an apparatus comprising means for providing, from a distributed unit of a radio access network node to a centralized unit control plane part of the radio access network node, an indication that the distributed unit supports network slices providing local switching at the distributed unit and configuring for each of the network slices providing local switching at the distributed unit, at least one data transmission context at the distributed unit such that a user plane of a user equipment providing a request for local switching at the distributed unit is terminated at the distributed unit and a protocol data unit session associated with the data transmission context becomes available to the user equipment for local switching at the distributed unit.

The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The apparatus may comprise means for receiving at least one of a time to live value and a local paging identity at the distributed unit from the centralized unit of the radio access network node.

The apparatus may comprise means for retaining the data transmission context at the distributed unit for the duration of the time to live value and releasing it thereafter.

The apparatus may comprise means for paging from the distributed unit to the user equipment unless the received time to live value has elapsed.

In a third aspect there is provided an apparatus comprising means for providing a request from a user equipment to a core network for local switching at a distributed unit of the radio access network node, the request including an indication the user equipment is allowed to use at least one network slice providing local switching at the distributed unit and configuring for each of the network slices providing local switching at the distributed unit at least one data transmission context at the user equipment such that the user equipment can use the protocol data unit session for local switching at the distributed unit.

The network slice may be associated with at least one of a protocol data unit type and a quality of service profile.

The apparatus may comprise means for receiving at least one of a time to live value and a local paging identity at the user equipment from the centralized unit of radio access network node when the centralized unit of the radio access network node releases the RRC connection of the user equipment.

The apparatus may comprise means for receiving paging from the distributed unit at the user equipment unless the received time to live value has elapsed.

In a fourth aspect there is provided a method, said method comprising receiving, from a distributed unit of a radio access network node at a centralized unit control plane part of the radio access network node, an indication that the distributed unit supports network slices providing local switching at the distributed unit, indicating, from the centralized unit control plane part of the radio access network node to a core network, that the distributed unit of the radio network node supports network slices providing local switching at the distributed unit, receiving a user equipment context from the core network, for a user equipment providing a request for local switching at the distributed unit, the request including an indication the user equipment is allowed to use at least one of the network slices providing local switching at the distributed unit, configuring for each of the network slices providing local switching at the distributed unit, at least one data transmission context at the distributed unit such that the user plane of the user equipment is terminated at the distributed unit and a protocol data unit session associated with the data transmission context becomes available to the user equipment for local switching at the distributed unit and configuring for each of the network slices providing local switching at the distributed unit at least one data transmission context at the user equipment such that the user equipment can use the protocol data unit session for local switching at the distributed unit.

The method may comprise providing an indication from the centralized unit of the radio access network node to the core network of at least one of the network slices that allow for local switching at the distributed unit and tracking area where local switching at the distributed unit is supported The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The method may comprise providing at least one of a time to live value and a local paging identity to the user equipment and the distributed unit from the centralized unit of the radio access network node when the centralized unit of the radio access network node releases a radio resource control connection of the user equipment.

The distributed unit may comprise an integrated access backhaul node.

In a fifth aspect there is provided a method comprising providing, from a distributed unit of a radio access network node to a centralized unit control plane part of the radio access network node, an indication that the distributed unit supports network slices providing local switching at the distributed unit and configuring for each of the network slices providing local switching at the distributed unit, at least one data transmission context at the distributed unit such that a user plane of a user equipment providing a request for local switching at the distributed unit is terminated at the distributed unit and a protocol data unit session associated with the data transmission context becomes available to the user equipment for local switching at the distributed unit.

The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The method may comprise receiving at least one of a time to live value and a local paging identity at the distributed unit from the centralized unit of the radio access network node.

The method may comprise retaining the data transmission context at the distributed unit for the duration of the time to live value and releasing it thereafter.

The method may comprise paging from the distributed unit to the user equipment unless the received time to live value has elapsed.

In a sixth aspect there is provided a method comprising providing a request from a user equipment to a core network for local switching at a distributed unit of the radio access network node, the request including an indication the user equipment is allowed to use at least one network slice providing local switching at the distributed unit and configuring for each of the network slices providing local switching at the distributed unit at least one data transmission context at the user equipment such that the user equipment can use the protocol data unit session for local switching at the distributed unit.

The network slice may be associated with at least one of a protocol data unit type and a quality of service profile.

The method may comprise receiving at least one of a time to live value and a local paging identity at the user equipment from the centralized unit of radio access network node when the centralized unit of the radio access network node releases the RRC connection of the user equipment.

The method may comprise receiving paging from the distributed unit at the user equipment unless the received time to live value has elapsed.

In a seventh aspect there is provided an apparatus comprising: at least one processor and at least one memory including a computer program code, the at least one memory and computer program code configured to, with the at least one processor, cause the apparatus at least to:

receive, from a distributed unit of a radio access network node at a centralized unit control plane part of the radio access network node, an indication that the distributed unit supports network slices providing local switching at the distributed unit, indicate, from the centralized unit control plane part of the radio access network node to a core network, that the distributed unit of the radio network node supports network slices providing local switching at the distributed unit, receive a user equipment context from the core network, for a user equipment providing a request for local switching at the distributed unit, the request including an indication the user equipment is allowed to use at least one of the network slices providing local switching at the distributed unit, configure for each of the network slices providing local switching at the distributed unit, at least one data transmission context at the distributed unit such that the user plane of the user equipment is terminated at the distributed unit and a protocol data unit session associated with the data transmission context becomes available to the user equipment for local switching at the distributed unit and configure for each of the network slices providing local switching at the distributed unit at least one data transmission context at the user equipment such that the user equipment can use the protocol data unit session for local switching at the distributed unit.

The apparatus may be configured to provide an indication from the centralized unit of the radio access network node to the core network of at least one of the network slices that allow for local switching at the distributed unit and tracking area where local switching at the distributed unit is supported The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The apparatus may be configured to provide at least one of a time to live value and a local paging identity to the user equipment and the distributed unit from the centralized unit of the radio access network node when the centralized unit of the radio access network node releases a radio resource control connection of the user equipment.

The distributed unit may comprise an integrated access backhaul node.

In an eighth aspect there is provided an apparatus comprising: at least one processor and at least one memory including a computer program code, the at least one memory and computer program code configured to, with the at least one processor, cause the apparatus at least to:

provide, from a distributed unit of a radio access network node to a centralized unit control plane part of the radio access network node, an indication that the distributed unit supports network slices providing local switching at the distributed unit and configure for each of the network slices providing local switching at the distributed unit, at least one data transmission context at the distributed unit such that a user plane of a user equipment providing a request for local switching at the distributed unit is terminated at the distributed unit and a protocol data unit session associated with the data transmission context becomes available to the user equipment for local switching at the distributed unit.

The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The apparatus may be configured to receive at least one of a time to live value and a local paging identity at the distributed unit from the centralized unit of the radio access network node.

The apparatus may be configured to retain the data transmission context at the distributed unit for the duration of the time to live value and release it thereafter.

The apparatus may be configured to page from the distributed unit to the user equipment unless the received time to live value has elapsed.

In a ninth aspect there is provided an apparatus comprising at least one processor and at least one memory including a computer program code, the at least one memory and computer program code configured to, with the at least one processor, cause the apparatus at least to:

provide a request from a user equipment to a core network for local switching at a distributed unit of the radio access network node, the request including an indication the user equipment is allowed to use at least one network slice providing local switching at the distributed unit; and configure for each of the network slices providing local switching at the distributed unit at least one data transmission context at the user equipment such that the user equipment can use the protocol data unit session for local switching at the distributed unit.

The network slice may be associated with at least one of a protocol data unit type and a quality of service profile.

The apparatus may be configured to receive at least one of a time to live value and a local paging identity at the user equipment from the centralized unit of radio access network node when the centralized unit of the radio access network node releases the RRC connection of the user equipment.

The apparatus may be configured to receive paging from the distributed unit at the user equipment unless the received time to live value has elapsed.

In a tenth aspect there is provided a computer readable medium comprising program instructions for causing an apparatus to perform at least the following receiving, from a distributed unit of a radio access network node to a centralized unit control plane part of the radio access network node, an indication that the distributed unit supports network slices providing local switching at the distributed unit, indicating, from the centralized unit control plane part of the radio access network node to a core network, that the distributed unit of the radio network node supports network slices providing local switching at the distributed unit;

receiving a user equipment context from the core network, for a user equipment providing a request for local switching at the distributed unit, the request including an indication the user equipment is allowed to use at least one of the network slices providing local switching at the distributed unit, configuring for each of the network slices providing local switching at the distributed unit, at least one data transmission context at the distributed unit such that the user plane of the user equipment is terminated at the distributed unit and a protocol data unit session associated with the data transmission context becomes available to the user equipment for local switching at the distributed unit and configuring for each of the network slices providing local switching at the distributed unit at least one data transmission context at the user equipment such that the user equipment can use the protocol data unit session for local switching at the distributed unit.

The apparatus may be caused to perform providing an indication from the centralized unit of the radio access network node to the core network of at least one of the network slices that allow for local switching at the distributed unit and tracking area where local switching at the distributed unit is supported The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The apparatus may be caused to perform providing at least one of a time to live value and a local paging identity to the user equipment and the distributed unit from the centralized unit of the radio access network node when the centralized unit of the radio access network node releases a radio resource control connection of the user equipment.

The distributed unit may comprise an integrated access backhaul node.

In an eleventh aspect there is provided a computer readable medium comprising program instructions for causing an apparatus to perform at least the following providing, from a distributed unit of a radio access network node at a centralized unit control plane part of the radio access network node, an indication that the distributed unit supports network slices providing local switching at the distributed unit and configuring for each of the network slices providing local switching at the distributed unit, at least one data transmission context at the distributed unit such that a user plane of a user equipment providing a request for local switching at the distributed unit is terminated at the distributed unit and a protocol data unit session associated with the data transmission context becomes available to the user equipment for local switching at the distributed unit.

The network slices providing local switching at the distributed unit may be identified by a flag, a slice or service type value or a slice differentiator field in the indication.

The network slice may be associated with at least one of a protocol data unit type and a quality of service profile, which is used to configure the data transmission context at the distributed unit.

The apparatus may be caused to perform receiving at least one of a time to live value and a local paging identity at the distributed unit from the centralized unit of the radio access network node.

The apparatus may be caused to perform retaining the data transmission context at the distributed unit for the duration of the time to live value and releasing it thereafter.

The apparatus may be caused to perform paging from the distributed unit to the user equipment unless the received time to live value has elapsed.

In a twelfth aspect there is provided a computer readable medium comprising program instructions for causing an apparatus to perform at least the following providing a request from a user equipment to a core network for local switching at a distributed unit of the radio access network node, the request including an indication the user equipment is allowed to use at least one network slice providing local switching at the distributed unit and configuring for each of the network slices providing local switching at the distributed unit at least one data transmission context at the user equipment such that the user equipment can use the protocol data unit session for local switching at the distributed unit.

The network slice may be associated with at least one of a protocol data unit type and a quality of service profile.

The apparatus may be caused to perform receiving at least one of a time to live value and a local paging identity at the user equipment from the centralized unit of radio access network node when the centralized unit of the radio access network node releases the RRC connection of the user equipment.

The apparatus may be caused to perform receiving paging from the distributed unit at the user equipment unless the received time to live value has elapsed.

In a thirteenth aspect there is provided a non-transitory computer readable medium comprising program instructions for causing an apparatus to perform at least the method according to the according to the fourth, fifth or sixth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
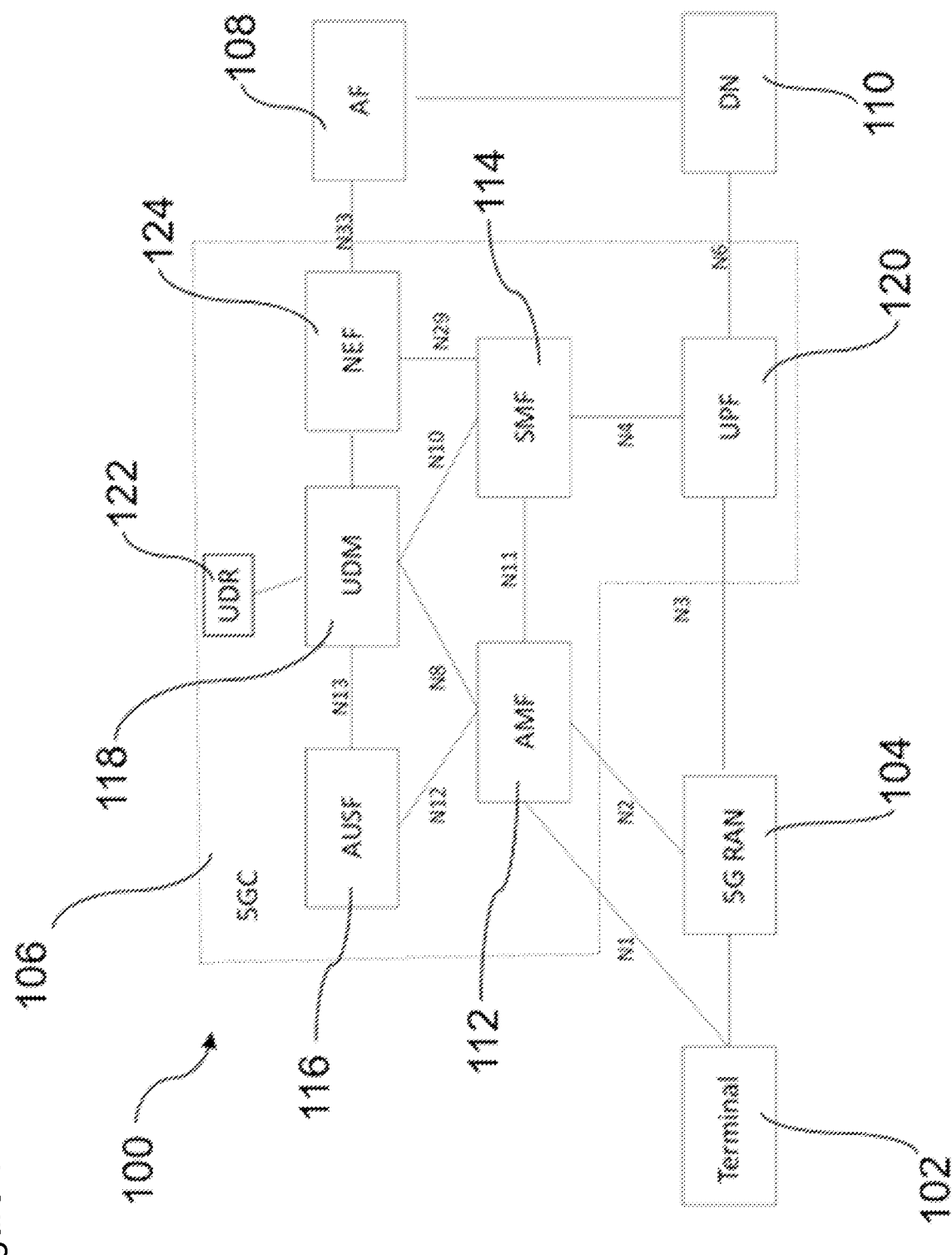
FIG. 1 shows a schematic diagram of an example 5G communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a terminal or UE via the radio access network (RAN). The 5GRAN may comprise one or more gNodeB (gNB) distributed unit functions connected to one or more gNodeB (gNB) centralized unit functions. The RAN may comprise one or more access nodes.

A UPF (User Plane Function) whose role is called PSA (PDU Session Anchor) may be responsible for forwarding frames back and forth between the DN (data network) and the tunnels established over the 5G towards the UE(s) exchanging traffic with the DN.

Figure 2:
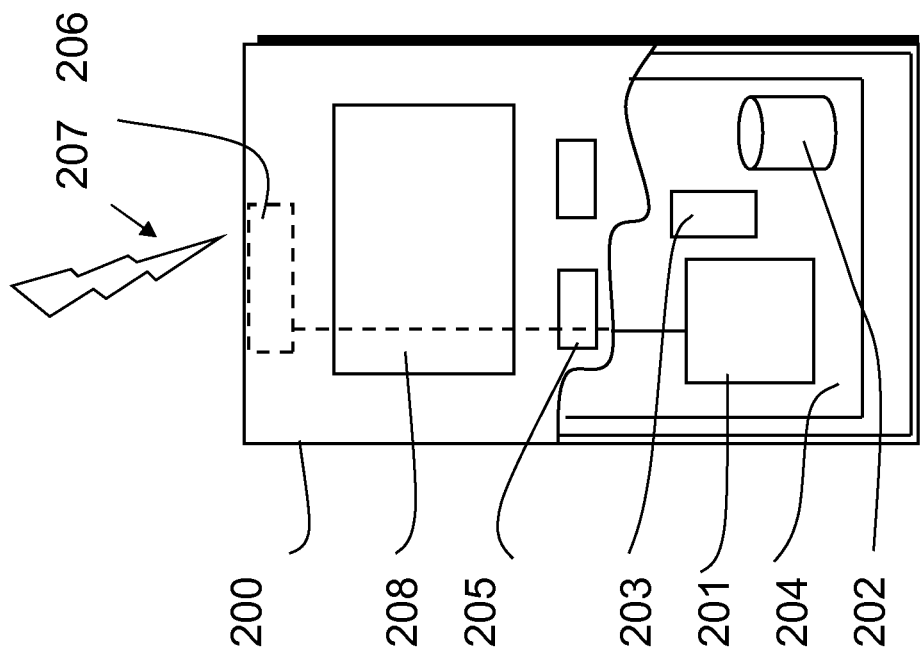
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
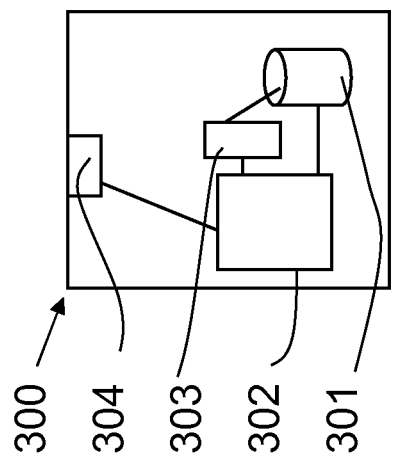
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Interactive services rely more and more on reduced latency. This applies to human oriented services such as gaming and AR/VR, some of which may be rendered and even executed in the edge cloud, as well as automation and process control in, e.g., a factory environment. Reduced latency may be also a requirement for many vehicular applications.

It may be possible to minimise latency by allowing interactions between UEs and resources at a Distributed Unit (DU) of a RAN node. This may provide the least possible latency and access to location dependent local resources that are suitable for the example use cases outlined above.

It has been proposed in the literature and standards (e.g. SIPTO (Selective IP Traffic Offload) and LIPA (Local IP Access) defined in TS 23.401) to place gateways as close as possible to the RAN, but this may not achieve the best possible latency. It may also require detection and reporting of UE location to the core network and selection of the best possible Gateway based on the UE location, introducing additional signalling/overhead.

Figure 4:
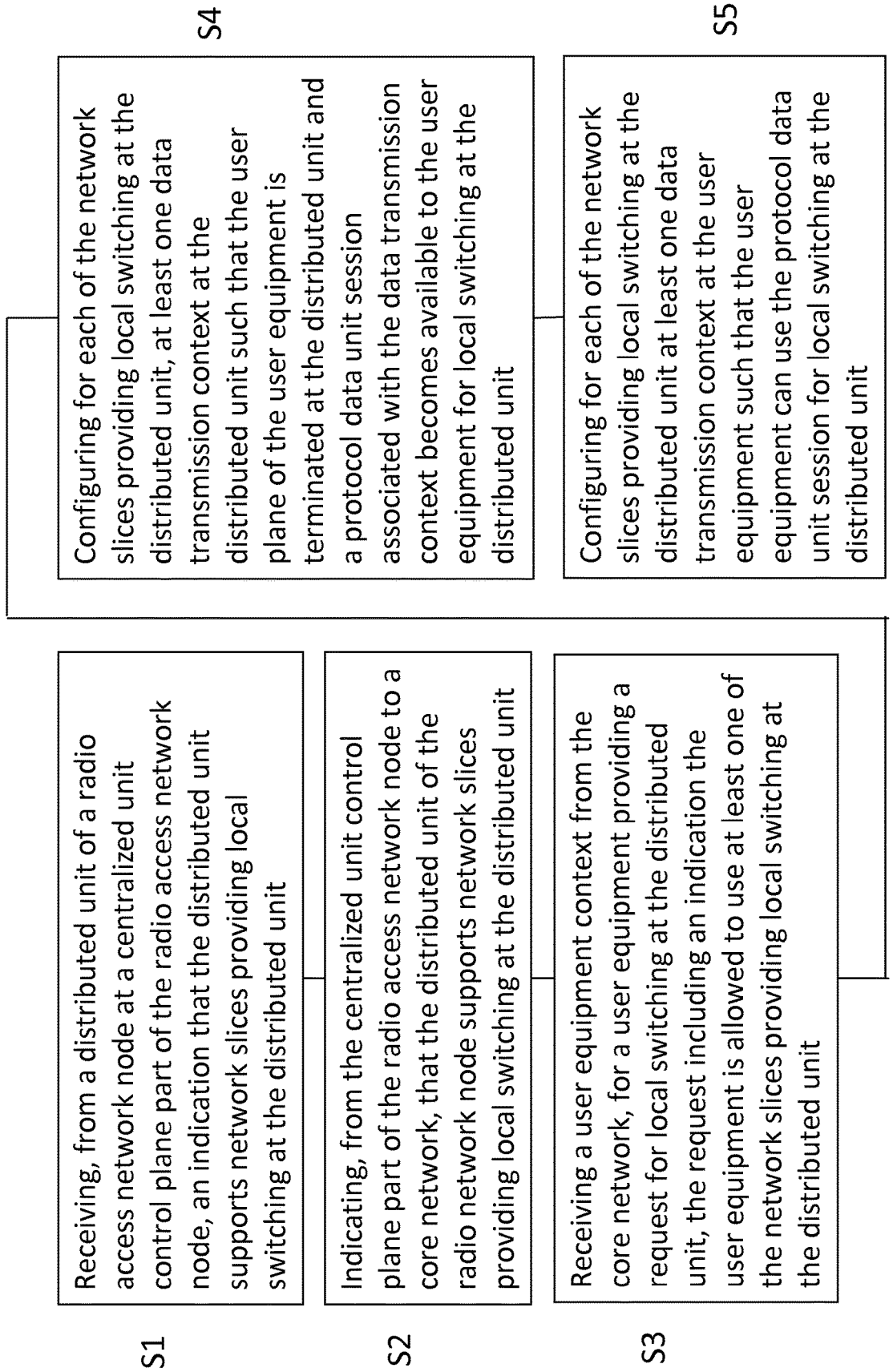
FIG. 4 shows a flowchart of a method according to an example embodiment.

FIG. 4 shows a flowchart of a method according to an example embodiment. The method may be performed at a centralised unit control plane part of a radio access network node.

In a first step, S1, the method comprises receiving, from a distributed unit of a radio access network node at a centralized unit control plane part of the radio access network node, an indication that the distributed unit supports network slices providing local switching at the distributed unit.

In a second step, S2, the method comprises indicating, from the centralized unit control plane part of the radio access network node to a core network, that the distributed unit of the radio network node supports network slices providing local switching at the distributed unit.

In a third step, S3, the method comprises receiving a user equipment context from the core network, for a user equipment providing a request for local switching at the distributed unit, the request including an indication the user equipment is allowed to use at least one of the network slices providing local switching at the distributed unit.

In a fourth step, S4, the method comprises configuring for each of the network slices providing local switching at the distributed unit, at least one data transmission context at the distributed unit such that the user plane of the user equipment is terminated at the distributed unit and a protocol data unit session associated with the data transmission context becomes available to the user equipment for local switching at the distributed unit.

In a fifth step, the method comprises configuring for each of the network slices providing local switching at the distributed unit at least one data transmission context at the user equipment such that the user equipment can use the protocol data unit session for local switching at the distributed unit.

FIG. 5 shows a flowchart of a method according to an example embodiment. The method may be performed at a distributed unit of a radio access network node.

In a first step, R1, the method comprises providing, from a distributed unit of a radio access network node to a centralized unit control plane part of the radio access network node, an indication that the distributed unit supports network slices providing local switching at the distributed unit.

In a second step R2, the method comprises configuring for each of the network slices providing local switching at the distributed unit, at least one data transmission context at the distributed unit such that a user plane of a user equipment providing a request for local switching at the distributed unit is terminated at the distributed unit and a protocol data unit session associated with the data transmission context becomes available to the user equipment for local switching at the distributed unit.

Figure 6:
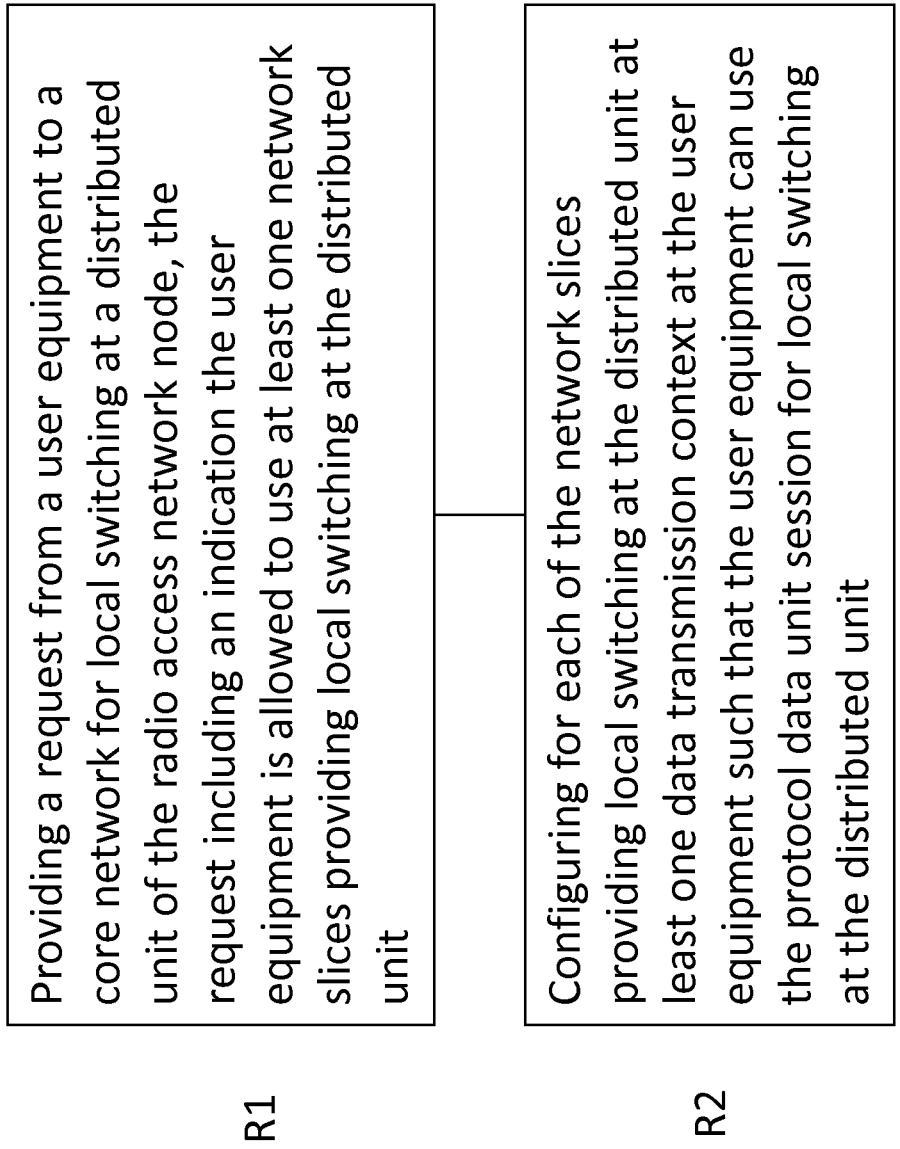
FIG. 6 shows a flowchart of a method according to an example embodiment.

FIG. 6 shows a flowchart of a method according to an example embodiment. The method may be performed at a user equipment.

In a first step, T1, the method comprises providing a request from a user equipment to a core network for local switching at a distributed unit of the radio access network node, the request including an indication the user equipment is allowed to use at least one network slices providing local switching at the distributed unit.

In a second step, T2, the method comprises configuring for each of the network slices providing local switching at the distributed unit at least one data transmission context at the user equipment such that the user equipment can use the protocol data unit session for local switching at the distributed unit.

Figure 7:
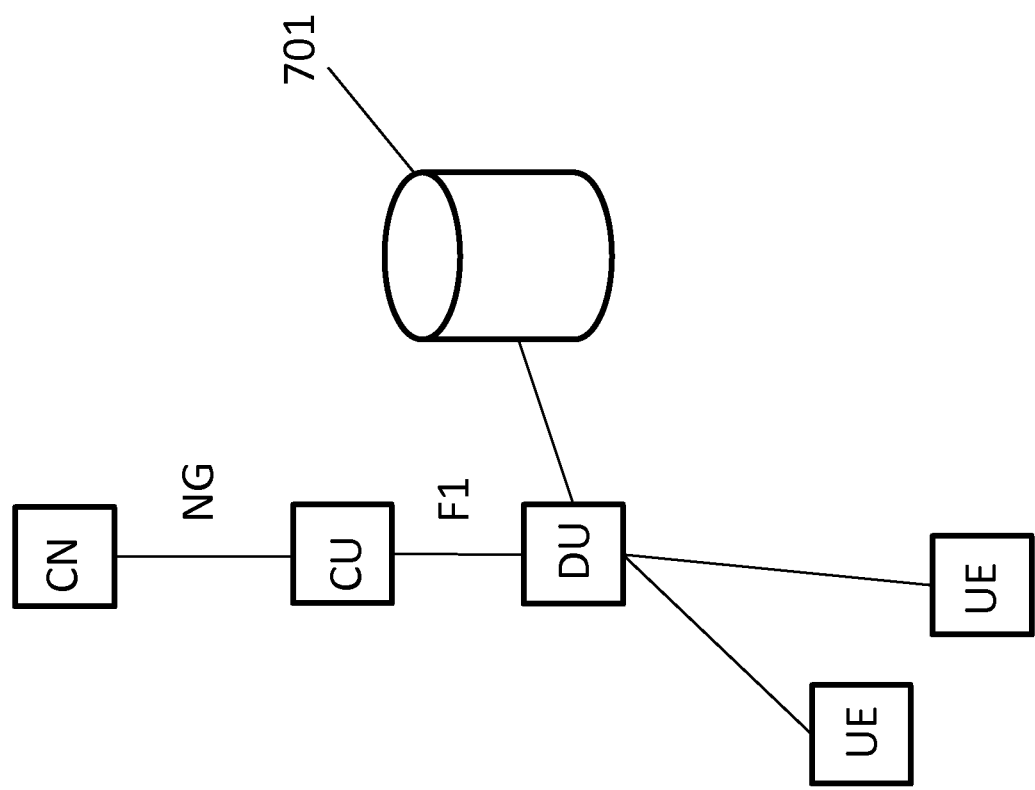
FIG. 7 shows a block diagram of an example embodiment where local switching is applied at a DU.

The method may allow local switching at a DU of a Distributed RAN such as that illustrated in FIG. 7. Locally available server 701 (or a set of servers) run locally available applications that may be used by virtue of local switching at the DU. The CN may comprise an AMF to which an indication that the distributed unit of the radio network node supports network slices providing local switching at the distributed unit may be sent from the CU-cp. The UE may provide the request for local switching at a distributed unit of the radio access network node to an AMF of a CN.

The method may comprise providing an indication from the centralized unit of the radio access network node to the core network of at least one of the network slices that allow for local switching and tracking area where local switching at the distributed unit is supported.

The network slices providing local switching at the distributed unit may be identified by a flag associated to the single network slice selection assistance information (S-NSSAI) which identifies the network slice, or by a specific slice/service type (SST) value or by a slice differentiator (SD) field of the S-NSSAI in the indication.

The network slice may be associated with a PDU type. The PDU-Type used for connectivity may be selected based on the S-NSSAI value. Each S-NSSAI may be associated to a PDU type (e.g. IPV4, Ethernet etc.)

The network slice may be associated with a quality of service profile. For example, the S-NSSAI may also be associated to a QoS profile in the DU.

The PDU type or QoS profile may be used to configure the data transmission context at the distributed unit.

The data transmission context may comprise PDCP and/or SDAP entities

Figure 8:
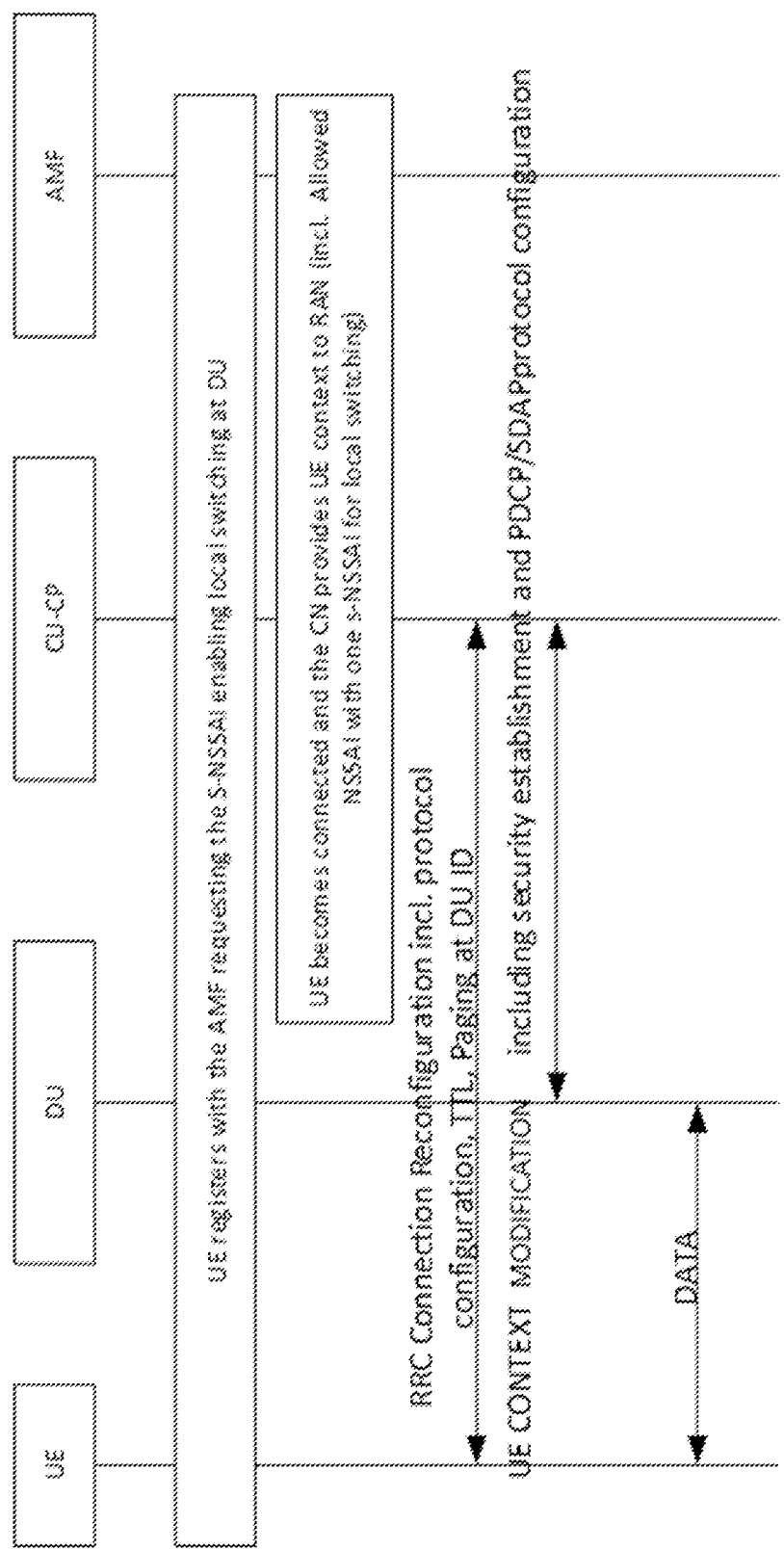
FIG. 8 shows a signalling flow for establishment of local switching at a DU according to an example embodiment.

FIG. 8 shows a signalling flow between a UE, DU, CU-cp and AMF according to an example embodiment of establishment of local switching at a DU.

In an example embodiment, such as that shown in FIG. 8, a RAN node indicates that it supports local switching at a DU to an AMF of the CN. The RAN node indicates its support of a certain set of Network slices that allow for the local switching at DUs and the Tracking area(s) where these are supported.

The DUs that support this local switching also support these S-NSSAIs and indicate support for the feature to the CU-cp and the CU-cp to the AMF per TA (tracking area).

The CU-cp configures PDCP/SDAP entities in the DUs so that the UP of the user is terminated at the DU.

These termination points at the DU are distributed PDCP/SDAP entities that the CU-cp can instantiate dynamically at the DU for the UE when UEs become connected and the S-NSSAI related to the Local switching at DU behaviour is included in the Allowed NSSAI the AMF provides to the CU-cp when the AMF provides the UE context to the RAN via NG-AP as the UE when the UE is CM-CONNECTED.

The RRC connection reconfiguration message, if the UE is requesting DU type IP by the S-NSSAI indicated, may provide the IP address to the UE. If Ethernet type is selected by the S-NSSAI indicated, the UE may receive an IP address via DHCP supported at the DU.

The PDU session associated to the local switching may have a reserved PDU session identity (or no PDU session ID) in the UE and require no NAS signalling to be established. The PDU session is managed at the Access stratum layer and is active as soon as the RRC Connection reconfiguration and F1-AP UE context UPDATE configuring the PDCP/SDAP for the UE are complete (that is, no SM signalling is required to establish it).

The method may comprise providing at least one of a time to live value and a local paging identity to the user equipment and the distributed unit from the centralized unit of the radio access network node when the centralized unit of the radio access network node releases a radio resource control connection of the user equipment.

The method may comprise retaining the data transmission context at the distributed unit for the duration of the time to live value and erasing it thereafter.

The method may comprise paging from the distributed unit to the user equipment unless the received time to live value has elapsed.

Figure 9:
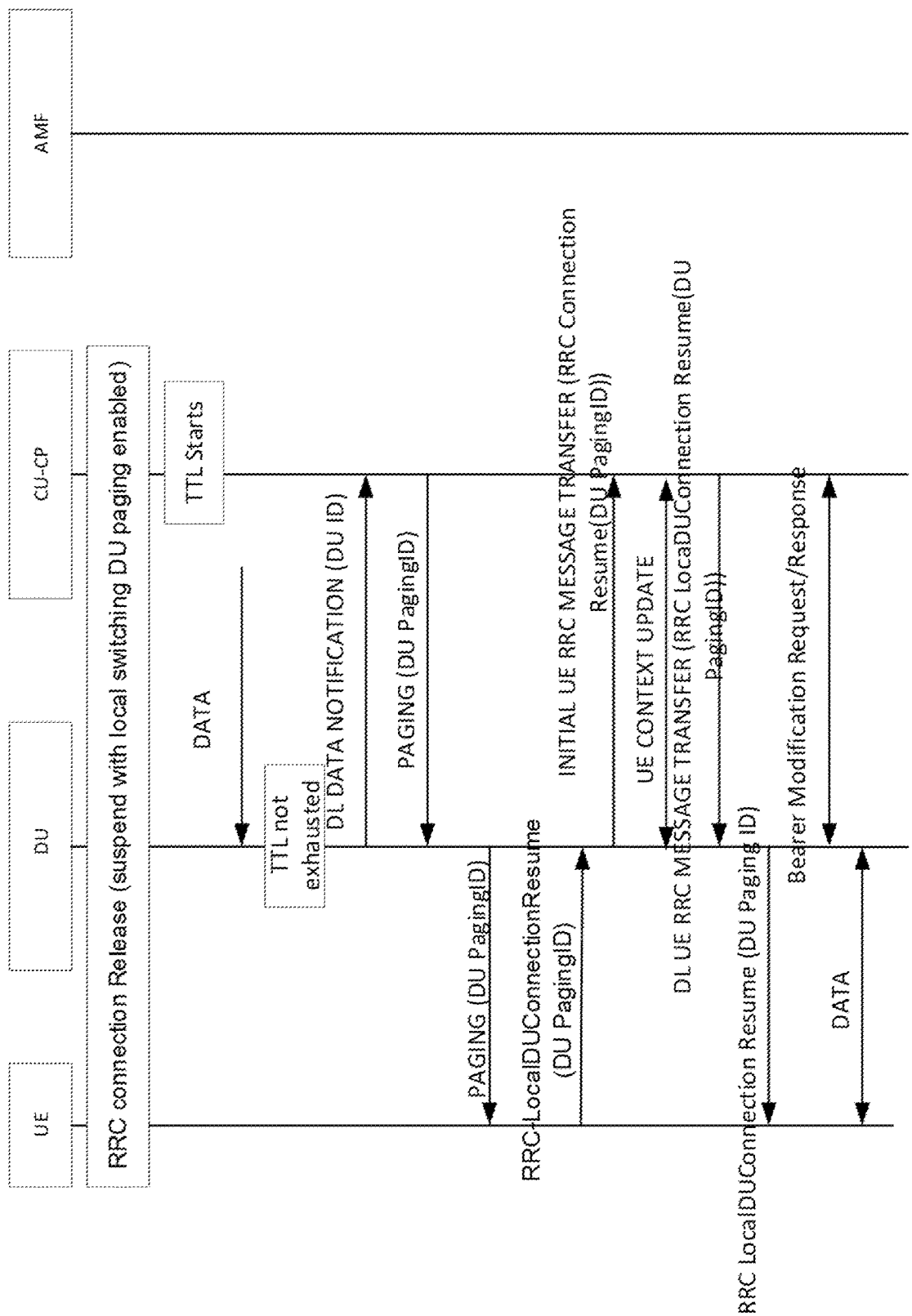
FIG. 9 shows a signalling flow for local DU paging according to an example embodiment.

FIG. 9 shows a signalling flow according to an example embodiment of local DU paging.

When the RRC connection is reconfigured when the UE becomes Connected, the CU-cp provides the UE and the DU with a TTL parameter and an ID for local paging at the DU (DU paging ID, which has local significance only for paging at the DU).

The UE may be paged on the POs calculated using the UE-ID also used for CN or RAN based paging (5G-S-TMSI mod 10) for the duration of this TTL parameter using the ID allocated by the CU-cp for the UE, after the connection is suspended with indication that Paging for local DU Identity is enabled.

The CU-cp and DU retains the protocol context for the UE for the duration of the TTL after the RRC connection is suspended with the indication Local SDU switching paging enabled), and so the UE can be reached for paging at DU.

When the UE is reached for paging at the DU, it resumes connectivity for local switching at DU by a RRC-LocalDU-ConnectionResume message (no other PDU session is resumed until a CN or RAN level paging in the RRC Inactive RAN Area is received).

The CU-cp, UE and DU retains the UE context for local switching for DU reachability only for the TTL duration, and thereafter it is released locally at all nodes. The CU-cp also releases the UE context towards the AMF when the TTL expires.

Figure 10:
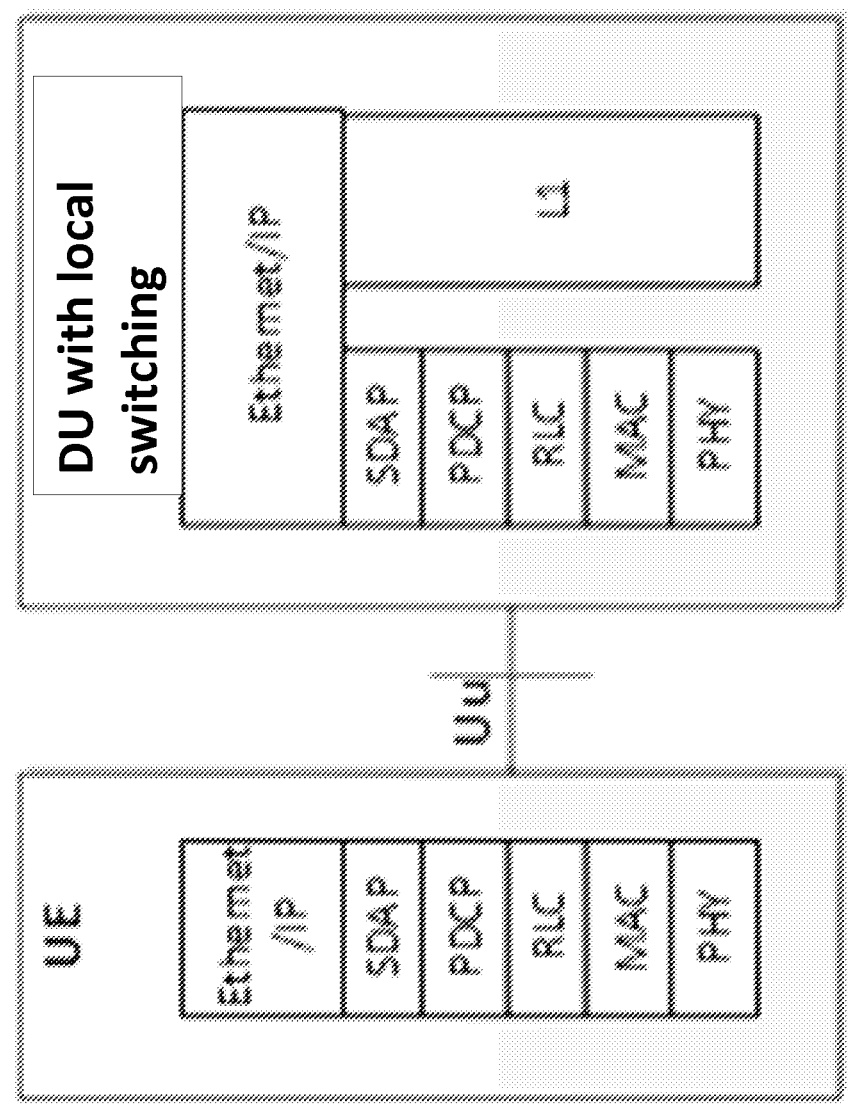
FIG. 10 shows a user plane stack according to an example embodiment.

FIG. 10 shows the user plane stack for a UE and a DU with local switching according to an example embodiment. Although a distributed unit of a RAN node has been referred to above, the method may be applicable to a remote unit of a distributed RAN node.

Figure 11:
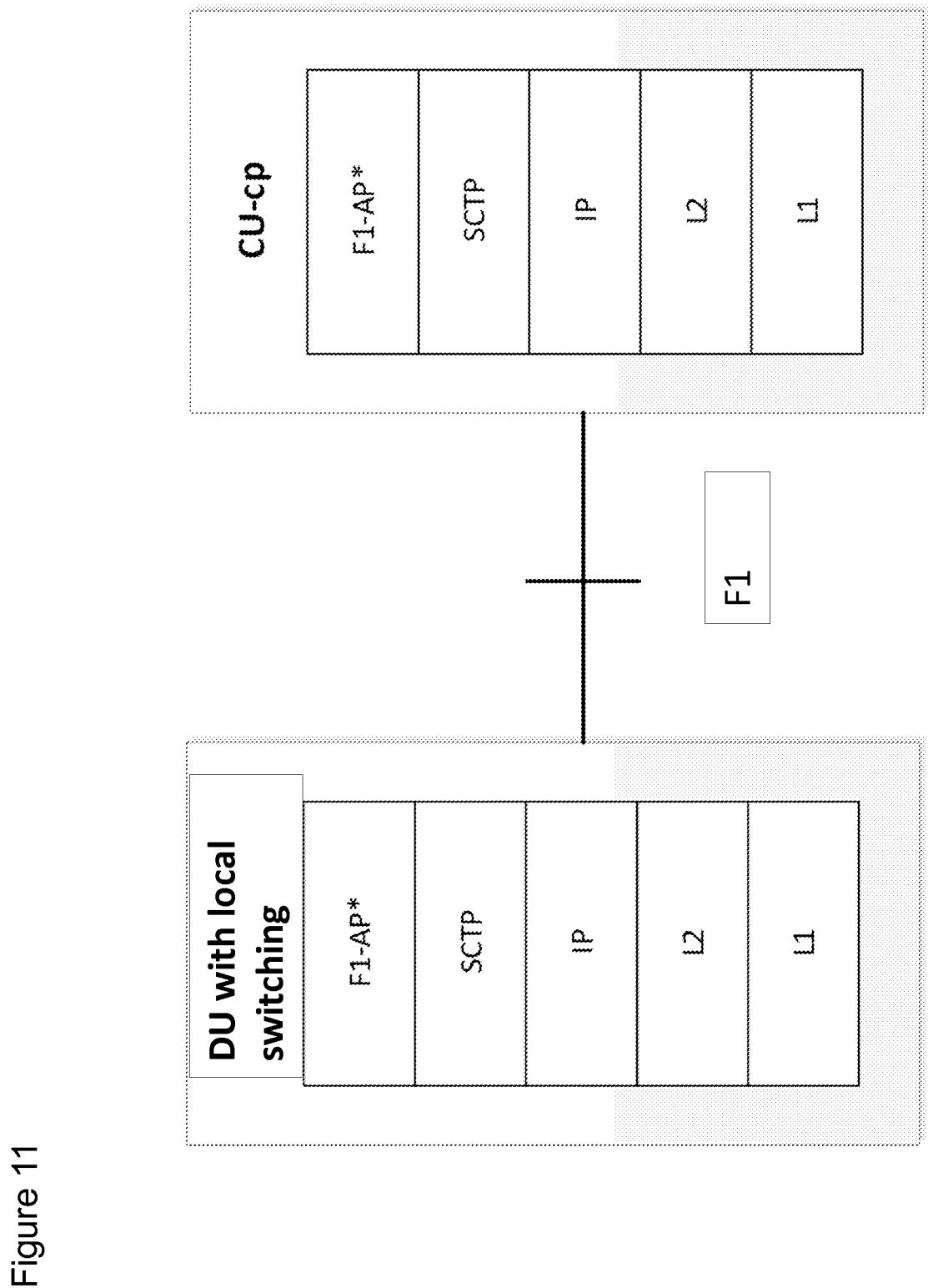
FIG. 11 shows a control plane stack according to an example embodiment.

FIG. 11 shows a control plane stack for a DU with local switching and a CU-cp according to an example embodiment. F1-AP interface may be reused with some modifications that align with the E1-AP behavior needed to configure PDCP/SDAP in the DU and handle DL data notifications and paging at DU.

Figure 12:
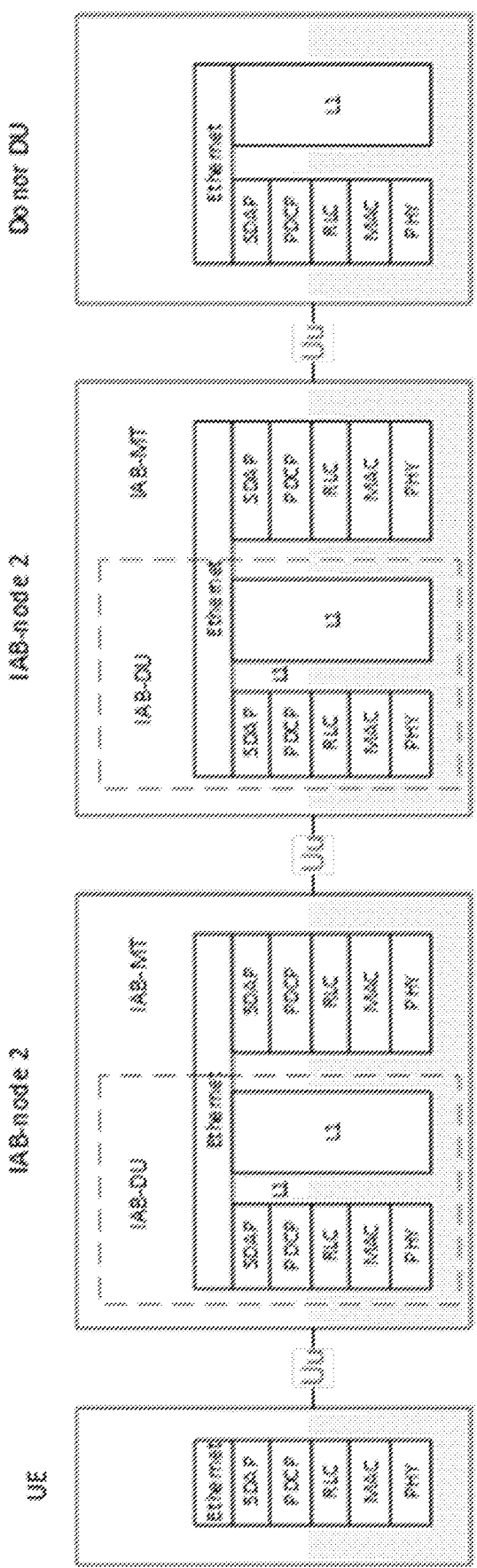
FIG. 12 shows a user plane stack in an example embodiment where an ethernet PDU type is used.

The method may also be applicable to the IAB (Integrated access Backhaul) case. That is, the distributed unit may be an IAB node. In this case the IAB-MT part of the IAB node requests access to the S-NSSAIs which support local switching at the DU. In this way it is possible to establish a local switching LAN in the IAB hierarchy as per the example embodiment shown in FIG. 12.

Figure 13:
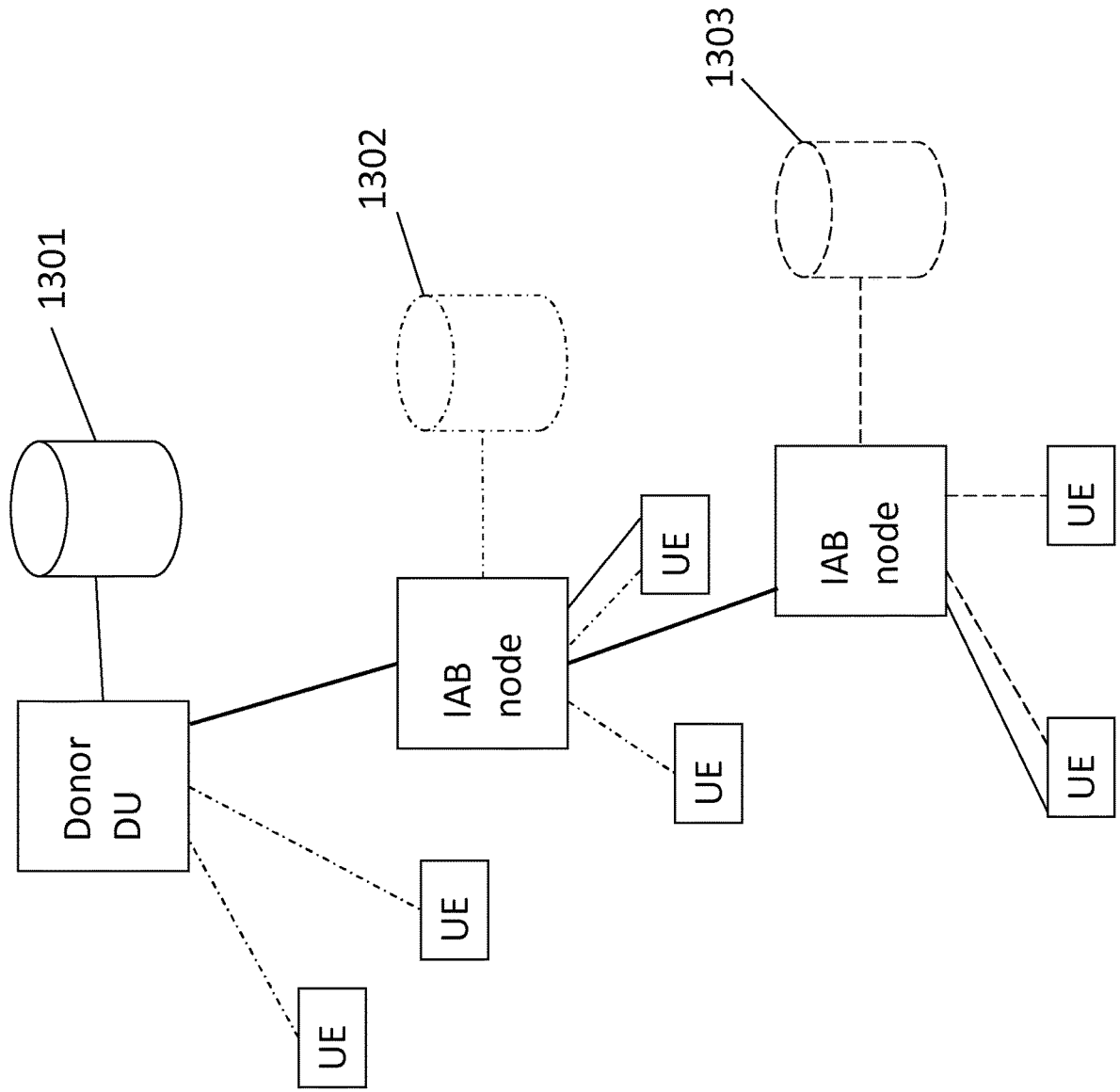
FIG. 13 shows a block diagram of an example embodiment where local switching is applied over an IAB hierarchy.

The resulting hierarchy for an example embodiment is shown in FIG. 13. Locally available servers 1301, 1302 and 1303 are running locally available applications that may be used by local switching at the DU (in this example embodiment, the IAB node). The dashed lines show the correspondence between each UE/DU connection and the locally available server.

Figure 14:
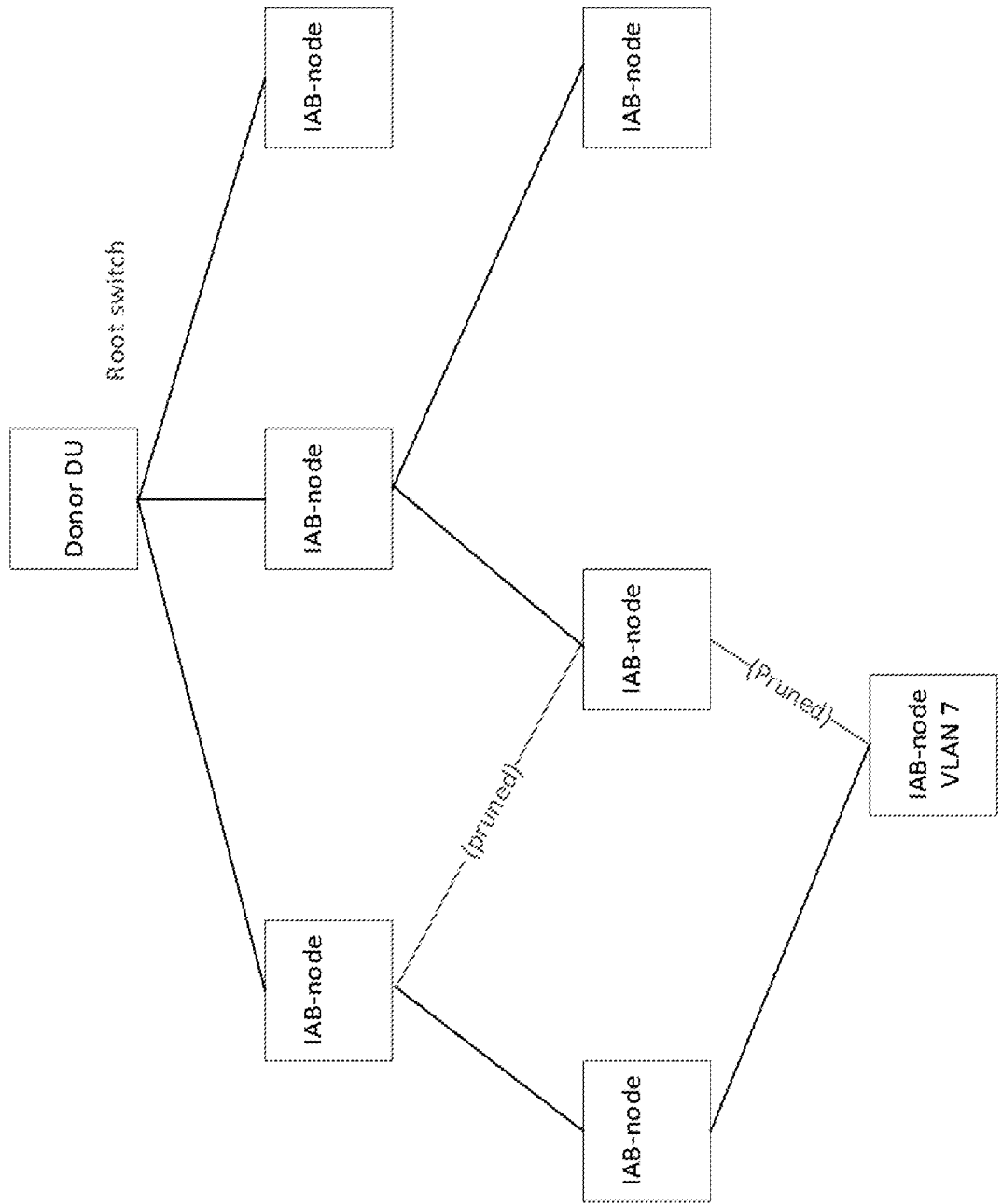
FIG. 14 shows a block diagram of a spanning tree protocol where an ethernet PDU type is used.

When Ethernet is used, the Spanning tree protocol may also operate and make sure there are no loops when an IAB node is dual homed (see FIG. 14).

The method may be implemented in a user equipment as described with reference to FIG. 2 or a control apparatus as described with reference to FIG. 3.

An apparatus may comprise means for receiving, from a distributed unit of a radio access network node at a centralized unit control plane part of the radio access network node, an indication that the distributed unit supports network slices providing local switching at the distributed unit, indicating, from the centralized unit control plane part of the radio access network node to a core network, that the distributed unit of the radio network node supports network slices providing local switching at the distributed unit, receiving a user equipment context from the core network, for a user equipment providing a request for local switching at the distributed unit, the request including an indication the user equipment is allowed to use at least one of the network slices providing local switching at the distributed unit, configuring for each of the network slices providing local switching at the distributed unit, at least one data transmission context at the distributed unit such that the user plane of the user equipment is terminated at the distributed unit and a protocol data unit session associated with the data transmission context becomes available to the user equipment for local switching at the distributed unit and configuring for each of the network slices providing local switching at the distributed unit at least one data transmission context at the user equipment such that the user equipment can use the protocol data unit session for local switching at the distributed unit.

Alternatively, or in addition, an apparatus may comprise means for providing, from a distributed unit of a radio access network node to a centralized unit control plane part of the radio access network node, an indication that the distributed unit supports network slices providing local switching at the distributed unit and configuring for each of the network slices providing local switching at the distributed unit, at least one data transmission context at the distributed unit such that a user plane of a user equipment providing a request for local switching at the distributed unit is terminated at the distributed unit and a protocol data unit session associated with the data transmission context becomes available to the user equipment for local switching at the distributed unit.

Alternatively, or in addition, an apparatus may comprise means for providing a request from a user equipment to a core network for local switching at a distributed unit of the radio access network node, the request including an indication the user equipment is allowed to use at least one network slices providing local switching at the distributed unit and configuring for each of the network slices providing local switching at the distributed unit at least one data transmission context at the user equipment such that the user equipment can use the protocol data unit session for local switching at the distributed unit.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. A method comprising:
receiving, from a distributed unit of a next generation node base station at a centralized unit control plane part of a next generation node base station, an indication that the distributed unit of the next generation node base station supports network slices providing local switching at the distributed unit of the next generation node base station;
indicating, from the centralized unit control plane part of the next generation node base station to an access and mobility management function (AMF), that the distributed unit of the next generation node base station supports network slices providing local switching at the distributed unit of the next generation node base station;
receiving, by the centralized unit control plane part of the next generation node base station, a user equipment context from the AMF, for a user equipment providing a request for local switching at the distributed unit of the next generation node base station, the request including an indication the user equipment is allowed to use at least one of the network slices providing local switching at the distributed unit of the next generation node base station;

configuring, by the centralized unit control plane part of the next generation node base station, for each of the network slices providing local switching at the distributed unit of the next generation node base station, at least one data transmission context at the distributed unit such that the user plane of the user equipment is terminated at the distributed unit of the next generation node base station and a protocol data unit session associated with the data transmission context becomes available to the user equipment for local switching at the distributed unit of the next generation node base station;

configuring, by the centralized unit control plane part of the next generation node base station, for each of the network slices providing local switching at the distributed unit of the next generation node base station at least one data transmission context at the user equipment such that the user equipment can use the protocol data unit session for local switching at the distributed unit of the next generation node base station; and instantiating, by the centralized unit control plane part of the next generation node base station, termination points at the distributed unit of the next generation node base station for the user equipment when the user equipment becomes connected to the distributed unit of the next generation node base station.

2. A method according to claim 1, further comprising:
providing, by the centralized unit control plane part of the next generation node base station, at least one of a time to live value and a local paging identity to the user equipment and the distributed unit of the next generation node base station from the centralized unit of the next generation node base station when the centralized unit of the next generation node base station releases a radio resource control connection of the user equipment.

3. A next generation node base station comprising:
at least one processor; and
at least one memory including a computer program code, the at least one memory and computer program code configured to, with the at least one processor, cause the next generation node base station at least to:
receive, from a distributed unit of the next generation node base station at a centralized unit control plane part of the next generation node base station, an indication that the distributed unit of the next generation node base station supports network slices providing local switching at the distributed unit of the next generation node base station;
indicate, from the centralized unit control plane part of the next generation node base station to an access and mobility management function (AMF), that the distributed unit of the next generation node base station supports network slices providing local switching at the distributed unit of the next generation node base station;
receive a user equipment context from the AMF, for a user equipment providing a request for local switching at the distributed unit of the next generation node base station, the request including an indication the user equipment is allowed to use at least one of the network slices providing local switching at the distributed unit of the next generation node base station;

configure for each of the network slices providing local switching at the distributed unit of the next generation node base station, at least one data transmission context at the distributed unit of the next generation node base station such that the user plane of the user equipment is terminated at the distributed unit of the next generation node base station and a protocol data unit session associated with the data transmission context becomes available to the user equipment for local switching at the distributed unit of the next generation node base station;

configure for each of the network slices providing local switching at the distributed unit of the next generation node base station at least one data transmission context at the user equipment such that the user equipment can use the protocol data unit session for local switching at the distributed unit of the next generation node base station; and instantiate termination points at the distributed unit of the next generation node base station for the user equipment when the user equipment becomes connected to the distributed unit of the next generation node base station.

4. The next generation node base station according to claim 3, wherein the at least one memory and computer program code are further configured to with the at least one processor cause the next generation node base station to:
provide an indication from the centralized unit of the next generation node base station to the (AMF) of at least one of the network slices that allow for local switching at the distributed unit of the next generation node base station and tracking area where local switching at the distributed unit of the next generation node base station is supported.

5. The next generation node base station according to claim 4, wherein the network slices providing local switching at the distributed unit of the next generation node base station are identified by a flag, a slice or service type value or a slice differentiator field in the indication.

6. The next generation node base station according to claim 4, wherein the network slice is associated with at least one of a protocol data unit type and a quality of service profile, which is used to configure the data transmission context at the distributed unit of the next generation node base station.

7. The next generation node base station according to claim 3, wherein the at least one memory and computer program code are further configured to, with the at least one processor, cause the next generation node base station to:
provide at least one of a time to live value and a local paging identity to the user equipment and the distributed unit of the next generation node base station from the centralized unit of the next generation node base station when the centralized unit of the next generation node base station releases a radio resource control connection of the user equipment.

8. The next generation node base station according to claim 3, wherein the network slices providing local switching at the distributed unit of the next generation node base station are identified by a flag, a slice or service type value or a slice differentiator field in the indication.

9. The next generation node base station according to claim 3, wherein the network slice is associated with at least one of a protocol data unit type and a quality of service profile, which is used to configure the data transmission context at the distributed unit of the next generation node base station.

10. The next generation node base station according to claim 3, wherein the at least one memory and computer program code are further configured to, with the at least one processor, cause the next generation node base station to:
  receive at least one of a time to live value and a local paging identity at the distributed unit of the next generation node base station from the centralized unit of the next generation node base station.

11. The next generation node base station according to claim 10, wherein the at least one memory and computer program code are further configured to, with the at least one processor, cause the next generation node base station to:
  retain the data transmission context at the distributed unit of the next generation node base station for the duration of the time to live value and releasing it thereafter.

12. The next generation node base station according to any of claim 10, wherein the at least one memory and computer program code are further configured to, with the at least one processor, cause the next generation node base station to:
  page from the distributed unit of the next generation node base station to the user equipment unless the received time to live value has elapsed.

* * * * *